United States Patent [19]

McMaster et al.

[11] 3,930,831

[45] Jan. 6, 1976

[54] FURNACE FOR HEAT TREATING GLASS SHEET MATERIAL

[76] Inventors: Harold A. McMaster, 707 Riverside Drive, Woodville, Ohio 43469; Norman C. Nitschke, 9102 Buck Road, Perrysburg, Ohio 43551

[22] Filed: Jan. 20, 1975

[21] Appl. No.: 542,339

Related U.S. Application Data

[60] Division of Ser. No. 435,130, Jan. 21, 1974, Pat. No. 3,907,132, which is a continuation-in-part of Ser. No. 365,939, June 1, 1973, abandoned.

[52] U.S. Cl. .................. 65/348; 432/145; 432/176; 432/185; 432/250
[51] Int. Cl.[2] ......................................... C03B 29/04
[58] Field of Search ...... 65/349, 350, 348; 432/185, 432/74, 176, 126, 56, 64, 145, 250

[56] References Cited
UNITED STATES PATENTS

| | | | |
|---|---|---|---|
| 1,311,286 | 7/1919 | Munhollow | 432/176 |
| 2,664,838 | 1/1954 | Sorensen | 432/250 X |
| 2,841,925 | 7/1958 | McMaster | 65/350 |

*Primary Examiner*—Arthur D. Kellogg
*Attorney, Agent, or Firm*—Reising, Ethington, Barnard, Perry & Brooks

[57] ABSTRACT

A furnace for heat treating glass sheet material including a circular enclosure having top, bottom and side walls of refractory material. Inlet and outlet openings are formed in the side walls. The side walls have an outer insulating layer and an inner layer of material having a low coefficient of thermal expansion, the inner layer having spaced end portions projecting beyond the outer layers and the periphery of the side walls to define said inlet and outlet openings. Each opening is controlled by doors, and each door includes an elongated support bar with a plurality of blocks of refractory material supported on the bar in end-to-end relationship. The blocks are adjustably secured to the bar to accommodate irregularities in the openings.

9 Claims, 9 Drawing Figures

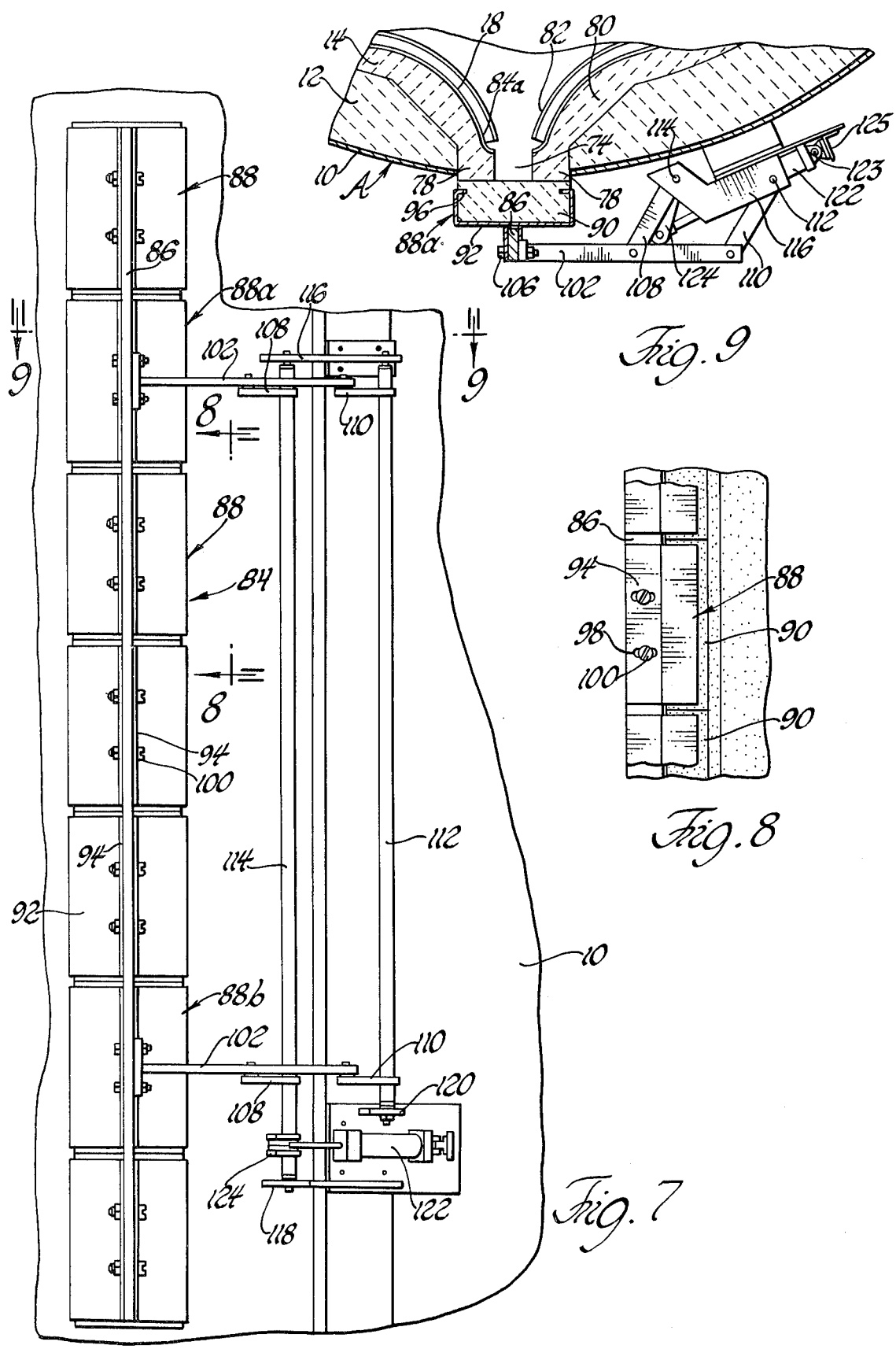

FURNACE FOR HEAT TREATING GLASS SHEET MATERIAL

This application is a division of application Ser. No. 435,130, filed Jan. 21, 1974, now U.S. Pat. No. 3,907,132 the latter application being a continuation-in-part of application Ser. No. 365,939, filed June 1, 1973, now abandoned. The entire disclosures of application Ser. No. 435,130 and application Ser. No. 365,939 are incorporated herein by reference.

This invention relates generally to heat treating furnaces, and is particularly concerned with furnaces used for heating glass sheet material and the like in a tempering process.

The tempering of glass sheets by first heating the sheet and then suddenly cooling the heated sheet increases the mechanical strength of the glass sheet, which, in and of itself, increases the safety and the use of the glass. In addition, however, the safety is increased because the tempered glass, when broken, disintegrates and shatters into small, relatively dull and harmless particles instead of into large sharp slivers as is the case with untempered glass.

Conventional glass tempering processes include systems wherein untempered glass sheets are suspended by tongs on a carrier. The carrier with the sheets supported thereon are then conveyed into a furnace and heated to a desired temperature, after which the carrier with the heated sheet is conveyed to a blasthead or quenching apparatus to suddenly cool and reduce the temperature of the glass to complete the tempering process.

During the heating of the glass in the furnace, if different portions of the glass sheet are exposed to uneven temperatures, the resulting stresses can cause warpage or breakage of the sheet. As the sheet being treated is conveyed from one stage to another of the process, it is of course undesirable for any of the moving parts to strike obstructions and cause breakage or mechanical damage to any of the components and parts of the system. It is of course also desirable to maintain a high rate of production with the glass tempering system.

An object of this invention is to provide a furnace for heat treating glass sheet material and the like wherein the exposure of different parts of the material being treated to different temperatures during the heat treating is minimized.

A still further object of the invention is to provide a furnace for heat treating glass sheet material and the like having one or more doors at openings through which the material enters and leaves the furnace, which doors are constructed to cooperate with the surfaces of the furnace surrounding the openings in such a manner as to minimize heat losses.

A furnace according to the present invention may include an enclosure having top, bottom and side walls of fire brick, ceramic material or other refractory material with a transverse partition spaced between the top and bottom walls and dividing the interior of the enclosure into two zones. The upper zone is the material treating zone, and the lower zone is primarily a gas mixing and heating zone. Electrical heating elements or other sources of heat are mounted in both zones. Gas treating and distributing means is provided in the lower zone and is operable to (1) draw gas from the upper zone into the lower zone, (2) draw ambient air or other gas from the exterior of the furnace enclosure into the lower zone, (3) mix the exterior gas and gas from the upper zone to provide a mixture having a substantially homogeneous temperature, (4) heat the homogeneous mixture of gases and (5) force the heated, homogeneous mixture of gases into the upper zone past the heating elements in both zones at the sides of the furnace for uniformly heating the sheet material being treated and for pressurizing the upper zone. The gas is recirculated into the upper glass treatment zone in a manner to minimize turbulence and to maintain a substantially uniform temperature over the entire surface of the glass sheet. A differential temperature control is provided to control the temperature of the heating elements in the upper and lower zones in order to maintain an adequate, uniform temperature in the furnace during the treatment stage.

The furnace is provided with a door for closing the inlet and outlet openings for the entry and exit of the material being treated which is made up of individual segments of refractory material that can be adjusted to accommodate irregularities on the surface surrounding the openings and minimize the loss of pressurized heated air from the upper zone.

Other objects, advantages and features of the invention will become apparent from the following description taken in connection with the accompanying drawings in which:

FIG. 7 is an elevational view of one of the furnace doors as viewed on lines 7—7 of FIG. 1;

FIG. 8 is a detailed view of one segment of the furnace door as viewed on lines 8—8 of FIG. 7; and FIG. 9 is a sectional view taken along lines 9—9 of FIG. 7.

Figure 1:
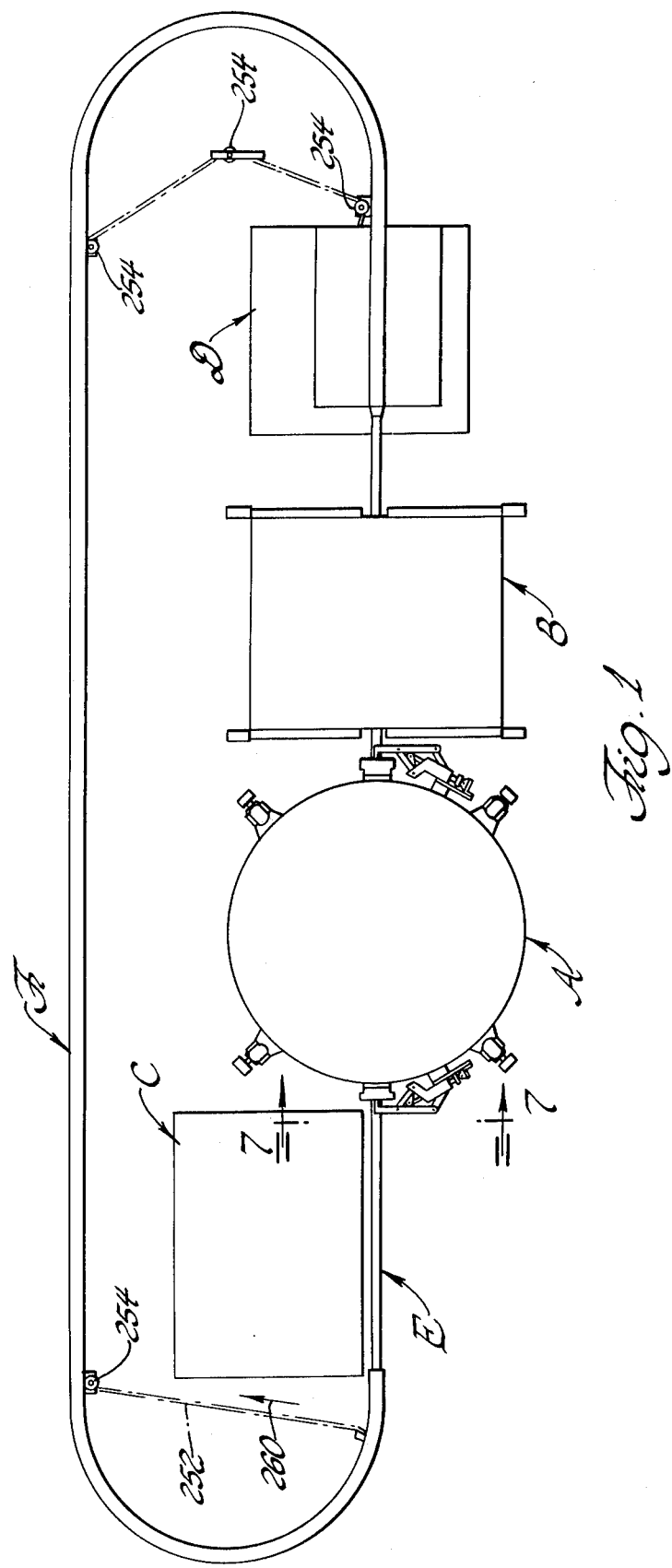
FIG. 1 is a plan view of a glass tempering system of the type that can utilize a furnace embodying the invention.

FIG. 1 illustrates a system including a treatment zone for glass sheet material and the like comprised of a furnace collectively designated by reference character A and a blasthead collectively designated by reference character B. A loading station C is defined at one end of the treatment zone, and an unloading station D is defined at the other end of the treatment zone. Glass sheets to be tempered by the furnace A and the blasthead B are loaded onto a conveying system at the loading station C and are removed from the conveying system at the unloading station D after the tempering operation is completed. The conveying system includes a drive conveyor designated collectively by reference character E extending from the loading station C through the treatment zone to the unloading station D, and a return conveyor F. The glass sheets G (FIGS. 3 and 4) are suspended from carriers designated collectively by reference numeral 2 by a plurality of tongs 4. The tongs 4 may be of conventional construction, several types of such tongs being disclosed in U.S. Pat. Nos. 2,677,918; 2,370,381; 3,392,006; 3,010,753 and 1,879,699. The glass sheets G are placed on the carriers 2 by the tongs 4 at the loading station C, and the drive conveyor E moves the carrier 2 with the glass sheet G suspended therefrom through the treatment zone to the unloading station D in a manner set forth in greater detail below. When the treated sheet of glass G is removed from the carrier 2 at the unloading station D, the return conveyor F carries the carrier 2 from the unloading station D to the loading station C for another treatment cycle.

Figure 2:
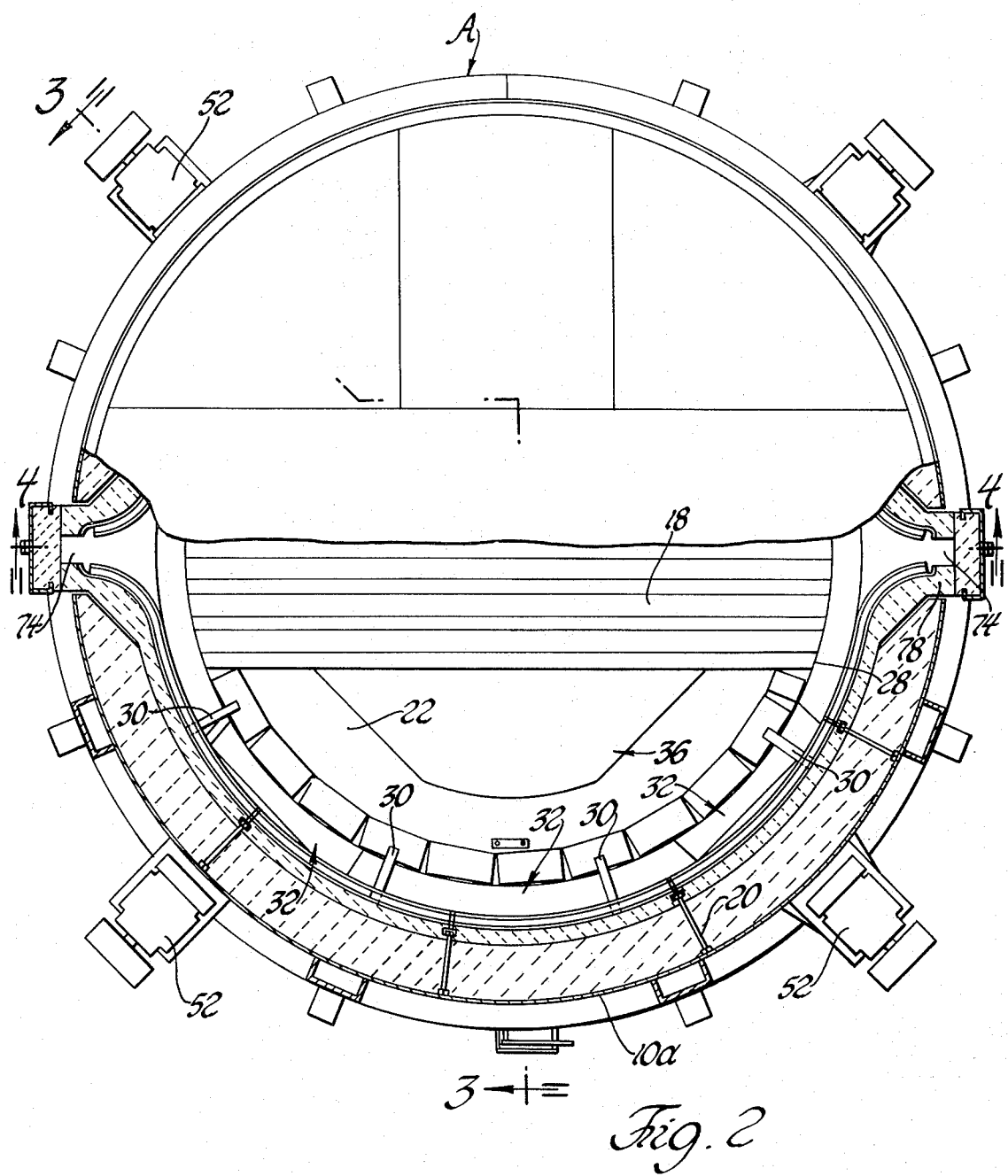
FIG. 2 is a top plan view, partially in section, of a heat treating furnace embodying the invention and of the type that may be used in the system shown in FIG. 1.
Figure 3:
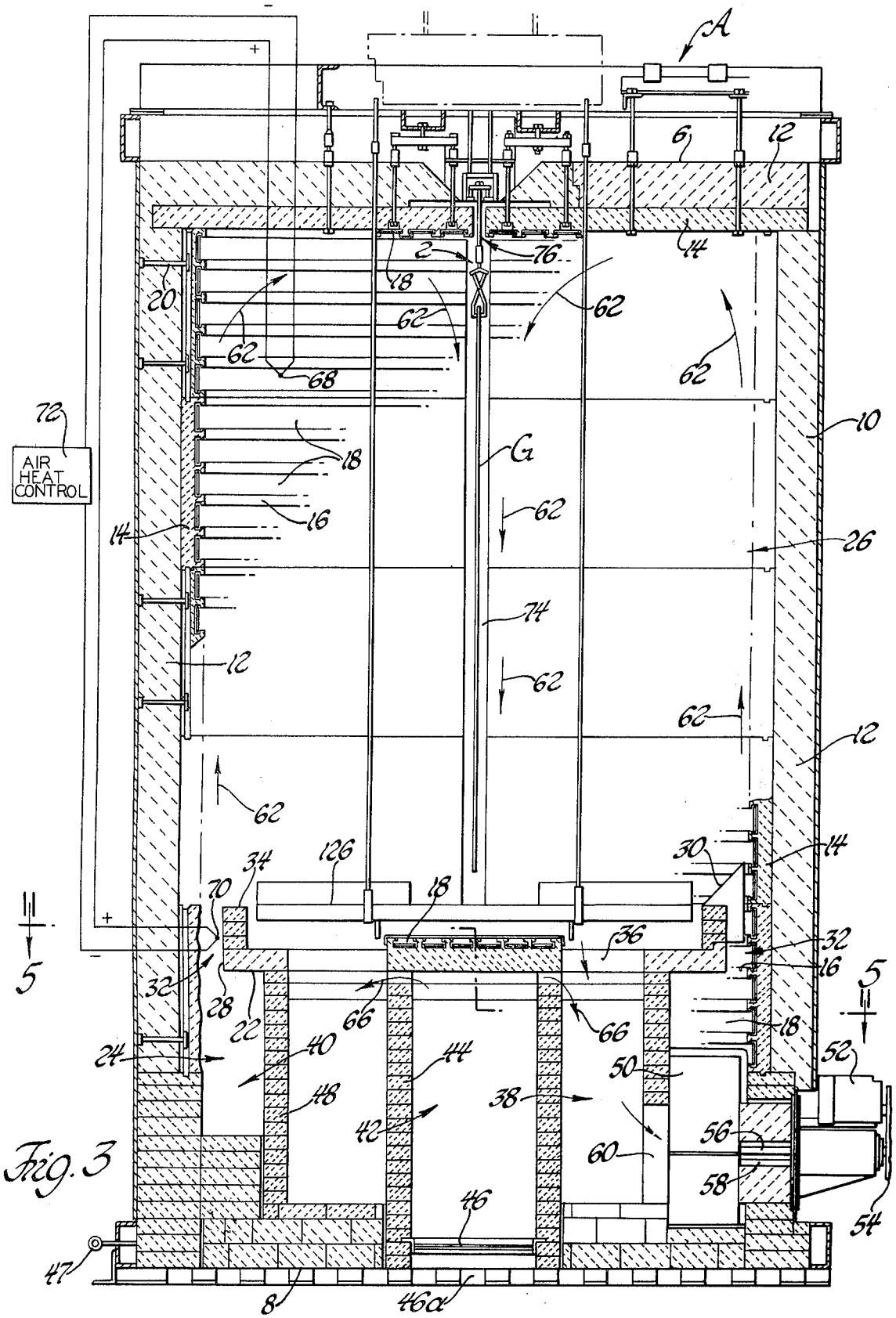
FIG. 3 is a sectional elevational view of the furnace of FIG. 2 taken on lines 3—3 of FIG. 2.
Figure 4:
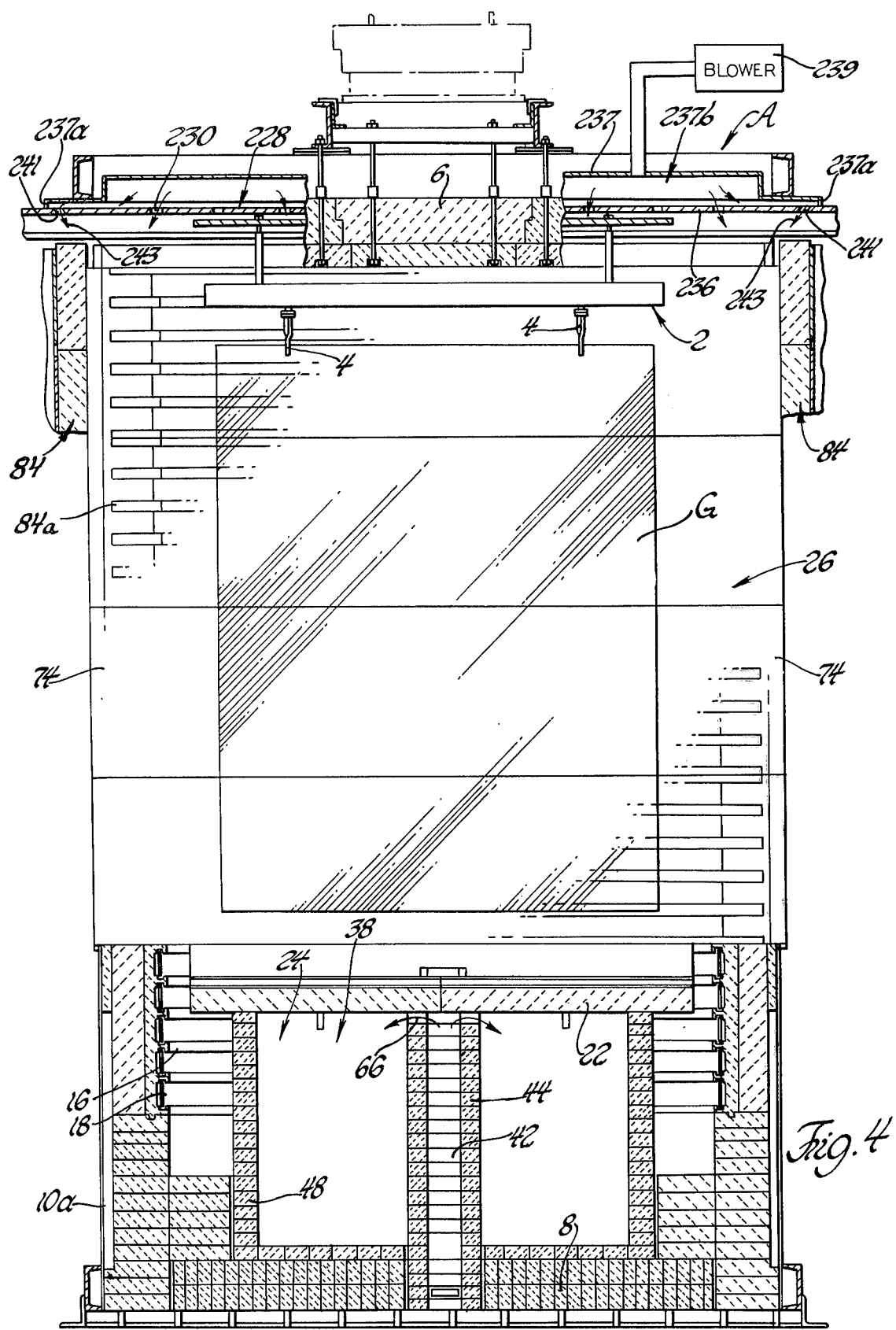
FIG. 4 is a sectional elevational view of the furnace of FIG. 2 taken on lines 4—4 of FIG. 2.

The construction of the furnace A is illustrated in detail in FIGS. 2 through 9. As shown in FIGS. 3 and 4, the furnace A comprises an enclosure having a top wall 6, a bottom wall 8, and a side wall 10. The top and side walls 6 and 10 are formed of an outer, insulating layer 12 of refractory material and an inner layer 14 of firebrick or other refractory material. The layers 12 and 14 may both be of castable material. The inner layer 14 of the side wall 10 is formed integrally with outwardly projecting T-sections 16. Adjacent pairs of the T-sections 16 form supports for electrical heating elements 18. The elements making up the layers 12 and 14 are cast with appropriate openings and recesses for receiving rod connectors 20 of conventional construction for securing the layers 12 and 14 together, and to the shell 10a.

A transverse partition 22 (FIGS. 3 and 4) is spaced between the top and bottom walls 6 and 8 and divides the interior of the enclosure into a first, or lower gas or air heating zone 24, and a second, upper glass heating zone 26. The heating elements 18 in the side wall 10 are located in both the lower and upper zones 24 and 26, respectively.

As is pointed out in greater detail below, gas or air treating and distributing means is located in the first, lower zone 24 which is operable to (1) draw relatively low temperature gas from the lower portion of the second, upper zone 26 into the lower zone 24, (2) draw ambient air or other gas from the exterior of the furnace A into the lower zone 24, (3) mix the exterior gas and the gas drawn from the upper zone 24 to provide a mixture having a substantially homogeneous temperature throughout, (4) heat the homogeneous mixture of gases, and (5) force the heated, homogeneous mixture of gases into the second, upper zone 26 along the side wall to help maintain a uniform, tempering temperature on the glass sheet G located in the upper zone 26, and to pressurize the upper zone.

The entire periphery 28 of the partition 22 is spaced from the inner side wall of the enclosure, and a plurality of vanes 30 in the form of blocks of refractory material are seated on the edge of the partition and span the gap between the peripheral edge 28 and the T-sections 16. The vanes 30 are spaced from each other to define a series of slots 32 at the periphery of the partition 22. The vanes 30, as shown in FIG. 3, have a lip which seats on the upper edge of an upstanding wall 34 formed by firebrick or other refractory material around the periphery of the partition 22, except at the central portion thereof in which are mounted additional horizontal heating elements 18 (FIGS. 2 and 3).

Spaced inwardly from the periphery of the partition 22 are openings 36 for providing a passage for the gases from the lower portion of the zone 26 into the lower zone 24.

Defined in the lower zone 24 is an intake chamber 38 and a discharge chamber 40. The openings 36 communicate with the intake chamber 38, and the slots 32 communicate with the discharge chamber 40.

A chimney 42 extends between the bottom wall 8 and the transverse partition 22. The chimney 42, in the illustrated embodiment, is enclosed by a rectangular wall 44 which also defines the inner walls of the intake chamber 38. The lower end of the chimney communicates with ambient atmosphere, and an adjustable damper 46 is mounted in the chimney near the lower end thereof. The damper is adjusted by a handle 47 (FIG. 5) mounted on the end of a rod 49 extending through the lower side wall of the furnace. A vertical wall 48 surrounds the chimney 44 and defines the outer wall of the intake chamber 38 and the inner wall of the discharge chamber 40. The outer wall of the discharge chamber 40 is defined by the side wall of the furnace enclosure.

Figure 5:
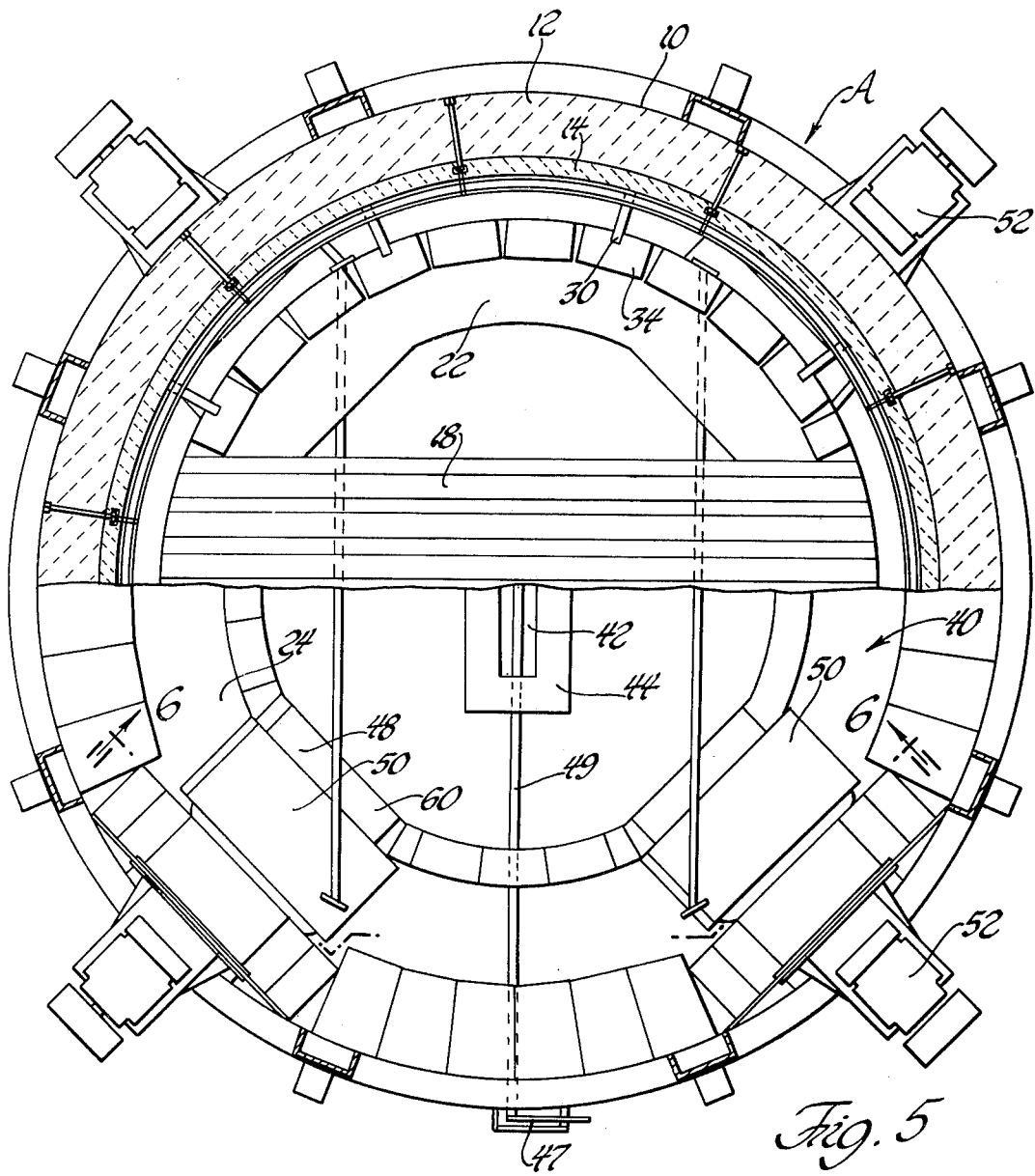
FIG. 5 is a sectional view taken approximately on lines 5—5 of FIG. 3.
Figure 6:
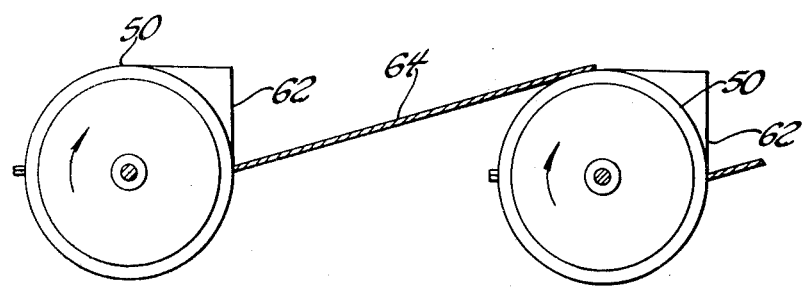
FIG. 6 is a sectional view taken approximately on lines 6—6 of FIG. 5.

A plurality of blowers 50 are mounted in the discharge chamber 24. In the illustrated embodiment, four such blowers are located within the discharge chamber 24 (FIG. 5). In the illustrated embodiment, the blowers are conventional scroll type blowers driven by motors 52 mounted externally of the furnace enclosure. In the illustrated embodiment, as shown in FIG. 3, each motor 52 drives the shaft 56 of its respective blower through gearing 54. The shaft 56 of the blower extends through an opening 58 in the side wall of the furnace enclosure. The opening 58 is of greater diameter than the shaft 56, and the shaft 56 is in unsealed relationship with the opening 58 so that operation of the blower draws ambient air through the opening 58 into the blower. The blower 50 also has its intake side connected with the intake chamber 38 through an opening 60 formed in the wall 48. Each of the blowers 50 has its discharge opening 62 directed along the length of the discharge chamber 24. As shown in FIG. 6, a ramp 64 extends from the lower end of the discharge opening 62 of one blower upwardly to the adjacent, downstream blower 50. The ramp 64 thus has its lower end disposed adjacent the discharge opening of the blower on the lower side of the discharge opening 62, and its upper end spaced from the lower end along the length of the discharge chamber and nearer to the slots 32 for deflecting the flow from the blower toward the slots into the second, upper zone 26.

As shown in FIGS. 3 and 4, a plurality of openings 66 are provided at the upper end of the chimney 42. Hence, operation of the blower draws air through the chimney 42 and openings 66 into chamber 38 as well as from the upper zone 26 through openings 36 to the intake sides of the blowers 50. The ambient air from the chimney 42 and the openings 58 surrounding the shafts 56 of the blower is mixed with the higher temperature gases drawn through the openings 36 from the upper gas treating zone 26. The action of the blowers in the lower zone 24, together with the arrangement of the chimney, intake chamber and discharge chamber, as well as the ramp 64, thoroughly mixes and homogenizes the air or other gases in the lower zone 24 to provide a substantially uniform temperature of the gas discharged through the peripheral slots 32 past the heating elements 18. The vanes 30 deflect the gases upwardly in the direction of the arrows 62 (FIG. 3) and reduce the spiraling, turbulent motion of the gas discharged from the blowers 50.

The gases are additionally heated by the heating elements 18 in the lower zone 24 at the slots 32 so that the heated gas rises along the heating elements 18 in the side wall of the upper zone 26 toward the inner surface of the top wall 6. The gases then circulate inwardly toward the glass sheet G and then downwardly to the openings 36. The circulation is such as to provide a minimum amount of turbulence and a minimum amount of temperature differential along the surface of the glass sheet G during the time that it is disposed in the furnace A, as well as to reduce the temperature differential over the inner surfaces of the upper zone 26. Thus, the heated gases from the lower zone 24 are forced upwardly along the periphery of the glass treating zone 26 to be exposed directly to the electrical heating elements 18 located in the side wall 10, and are drawn through the intake chamber 38 by the blowers at a location spaced inwardly from the side wall 10 so that the gases move downwardly along the surfaces of the glass sheet G. As pointed out previously, the vanes 30 reduce the turbulence of the gas flowing into the upper zone 26 from the lower zone 24 and deflect the gases upwardly in a slightly spiral path.

The electrical heating elements 18 in the lower and upper zones 24 and 26 are controlled by a differential air heat controller 72. The controller 72 responds to the temperature differential between the slots 32 and the upper zone 26 as sensed by a pair of thermocouples 68 and 70. The thermocouple 68 is disposed in the upper zone 26 and the thermocouple 70 is disposed in the slot 32. If a temperature differential is sensed by the controller 72 as a result of a low temperature condition at thermocouple 70, additional energy is supplied to the heating elements 18 in the lower zone 24 to reduce or eliminate the temperature differential. The temperature of the upper zone 26 is controlled by a separate thermocouple and temperature controller (not shown).

In order to permit the glass sheet G to move through the furnace, diametrically opposed openings 74 are formed in the side wall 10. Similarly, a slot 76 extends between the openings 74 in the top wall 6 to permit the carrier 2 to pass through the furnace. With reference to FIG. 9, the inner layer 14 of silica material has end portions 78 which project beyond the insulating layer 12 and define the opening 74. The illustrated furnace A, as shown in FIGS. 2 and 5, is of substantially circular cross-section. Hence the inner layer 14 comprises two semi-circular sections in cross-section with outwardly curved and slightly thickened portions 80 terminating in the end portions 78 projecting beyond the periphery of the side wall 10. The space between the end portions 78, as pointed out previously, defines the opening 74 through which the vertically suspended glass sheet passes to enter into or exit from the furnace. Due to the low coefficient of thermal expansion of the silica material 14 held to the shell 10a by rod connectors 20, the surfaces surrounding the opening 24 maintain a constant shape at all temperatures. The T-sections 16 are also formed with outwardly curved end portions 82 conforming to the configuration of portions 80. The heating elements 18 additionally have outwardly curved portions 84a terminating at the opening 74 so that heat losses through the opening 74 are minimized when the opening is uncovered.

As pointed out previously, heating elements 18 are also provided in the top wall 6 on each side of the slot 76 (FIG. 3) to minimize heat losses through the slot 76. Additional heating elements 18 may, if desired, be mounted in the lower surface of the partition 22 at the upper end of the chimney 42 to add heat to the air in chimney 42 before it passes through the openings 66.

The openings 74 on the inlet and outlet sides of the furnace A are each controlled by doors which may be of identical construction. The construction of one of the doors is illustrated in detail in FIGS. 7, 8 and 9. Reference numeral 84 collectively designates a door movable between open and closed positions with respect to the opening 74 and which is made up of a plurality of segments 88, each adjustably secured to an elongated support bar 86.

Each of the segments 88 is comprised of a block 90 of ceramic or other refractory material, which material may be the same as the material of layer 14, supported in jackets or sheaths 92 of metal such as steel. The jackets 92 each include outwardly projecting support bar flanges 94 and inwardly projecting block engaging flages 96 (FIG. 9). The flanges 96 are received in slots formed in the respective blocks 90 to secure the blocks to the jackets 92. The flanges 94 are formed with elongated slots 98, and conventional bolts 100 are inserted through openings in the support bar 86 aligned with the slots 98 to secure the segments 88 individually to the support bar 86. The slots 98 permit the segments to be individually adjusted with respect to the support bar 86 to accommodate any irregularities in the surfaces of the projections 78 with which the door is engaged when it is in the closed position as shown in FIG. 9 so that each segment 88 may have as tight a fit as possible with the projections 78 to assure a minimum loss of heat when the doors are closed.

Two of the segments 88 are designated in FIG. 7 by reference numerals 88a and 88b. Door actuating arms 102 are secured to the support bar 86 at segments 88a and 88b. The actuating arms 102 are each welded to plates 104 which in turn are secured by conventional bolts 106 to the support bar 86. Slotted openings are provided either in the support bar 86 or plates 104 to permit adjustment of the segments 88a and b in the same manner as the remaining blocks 88. The actuating arm 102 is pivotally connected at spaced points to the ends of parallel links 108 and 110. Link 108 has its other end nonrotatably secured to a rod 114, and link 110 has its other end nonrotatably secured to a rod 112. Rods 112 and 114 are rotatably supported at their upper end to a bracket 116. Rod 112 is rotatably supported at its lower end in a bracket 120 and rod 114 is rotatably supported at its lower end in a bracket 118.

The door 84 is moved between its open and closed positions by a hydraulic ram 122 having its cylinder end pivotally connected at 123 to a bracket 125 and its piston end pivotally connected to an operating lever 124 nonrotatably secured to rod 114. When the ram 122 is retracted from the position shown in FIGS. 7 and 9, the links 108 and 110 pivot about the axes of the respective rods 114 and 112 in a counterclockwise direction to move the door 84 away from the opening 74.

In summary, FIGS. 3 through 9 illustrate a furnace having a substantially circular cross-section with a plurality of blower units 50, 52 disposed about the periphery of the furnace in a zone below and separated from the glass treating zone 26. Make-up air can be supplied through the rectangular chimney 24 and its openings 66 in addition to recirculating the air from the glass treating upper zone 26 past the heating elements 18 at the sides of the furnce. Furthermore, the layer or blocks 14 of material at the top or roof of the furnace is also integrally formed with T-sections 16 forming grooves into which the elongated heating elements 18 at the roof of the glass treating zone 26 can be slipped into and secured into place. When the blowers are operating, make-up air can be drawn into the furnace through openings 46a at the lower end of the chimney 42 at a rate depending upon the position of the adjustable damper 46. The ramps 64 associated with the blowers 50 (FIG. 6) serve to mix and recirculate the air upwardly and tangentially toward the return passages defined by the slots 32, while the vanes or blocks 30 deflect the recirculated air vertically and somewhat tangentially along the side walls of the furnace and the heating elements 18 located at the side walls. The openings 58 surrounding the blower shaft also prevent overheating of the blowers when the blowers are not operating because the chimney effect causes outside air to always be drawn through the openings 58 to cool the blowers.

Again referring to FIG. 3, reference numeral 126 designates a collection tray suspended from the top or roof 6 of the furnace by rods 128. The tray 126 collects any pieces of glass that are broken during the heat treating process and facilitates removal of the broken glass from the furnace and prevents the pieces from falling into places of difficult access in the furnace.

While a specific form of the invention has been illustrated and described in the foregoing specification and accompanying drawings, it will be apparent to those skilled in the art that the invention is not limited to the exact construction shown, and that alterations and modifications in the construction and arrangement of parts, all falling within the scope of the invention, can be made by those skilled in the art.

We claim:

1. A furnace for heat treating glass sheet material and the like comprising: an enclosure having walls of refractory material, said walls having an outer insulating layer and an inner layer of material having a low coefficient of thermal expansion; at least one opening defined in said enclosure; said inner layer having spaced end portions projecting externally beyond said outer layer and the outer periphery of said enclosure to define said opening.

2. A furnace as claimed in claim 1 further including a door for controlling said opening, said door comprising an elongated support bar, a plurality of blocks of refractory material supported on said bar in end-to-end relationship, and means adjustably securing each of said blocks to said bar to accommodate irregularities in said opening.

3. A furnace as claimed in claim 2 wherein said last named means comprises a metal jacket for each of said blocks partially enclosing the respective block; flanges projecting from said jackets and receiving said bar; and means securing said flanges to said rod to permit selective adjustment of said blocks transversely of said bar.

4. A furnace for heat treating glass sheet material and the like comprising: a top, bottom and side walls of refractory material; an inlet opening and an outlet opening in the side walls; said side walls having an outer insulating layer and an inner layer of material having a low coefficient of thermal expansion; said inner layer having spaced end portions projecting externally beyond the outer layer and the periphery of the side walls to define said inlet and outlet openings.

5. A furnace as claimed in claim 4 wherein said furnace is cylindrical and said inner layer comprises two semi-circular sections in cross-section having slightly thickened portions terminating at said end portions.

6. A furnace as claimed in claim 5 further including a pair of doors, each controlling one of said openings, each of said doors comprising an elongated support bar, a plurality of blocks of refractory material supported on said bar in end-to-end relationship and means adjustably securing each of said blocks to said bar to accommodate irregularities in the opening controlled thereby.

7. A furnace as claimed in claim 6 wherein said last named means comprises a metal jacket for each of said blocks partially enclosing the respective block; flanges projecting from said jackets and receiving said bar; and means securing said flanges to said rod to permit selective adjustment of said blocks transversely of said bar.

8. A door for controlling the opening of a furnace for heat treating glass sheet material and the like comprising: an elongated support bar; a plurality of blocks of refractory material supported on said bar in end-to-end relationship to define said door and means adjustably securing each of said blocks to said bar to permit the blocks to be individually adjusted with respect to said bar to accommodate irregularities in the opening to be controlled by said door said last named means comprising a metal jacket for each of said blocks partially enclosing the respective block; flanges projecting from said jackets and receiving said bar; and means securing said flanges to said rod to permit selective adjustment of said blocks transversely of said bar.

9. A furnace for heat treating glass sheet material and the like comprising: an enclosure having a cylindrical side wall of circular cross-section; said side wall having an outer insulating layer and an inner layer of material having a low coefficient of thermal expansion; a pair of diametrically opposed openings formed in said side wall each extending substantially the full length of said side wall in parallel relationship with the longitudinal axis thereof; said inner layer having a pair of spaced end portions at each of said openings projecting externally beyond said outer layer and the outer periphery of said side wall and defining the walls of said openings; a pair of doors, each controlling one of said openings; each of said doors comprising a plurality of blocks of refractory material supported in end-to-end relationship and for selective adjustment relative to each other toward and away from the longitudinal axis of said cyclindrical side wall to accommodate irregularities in the walls of the opening controlled thereby.

* * * * *